July 14, 1959
R. MOORE
2,894,707
TRANSMISSION SUPPORTING DEVICE
Filed Sept. 24, 1954
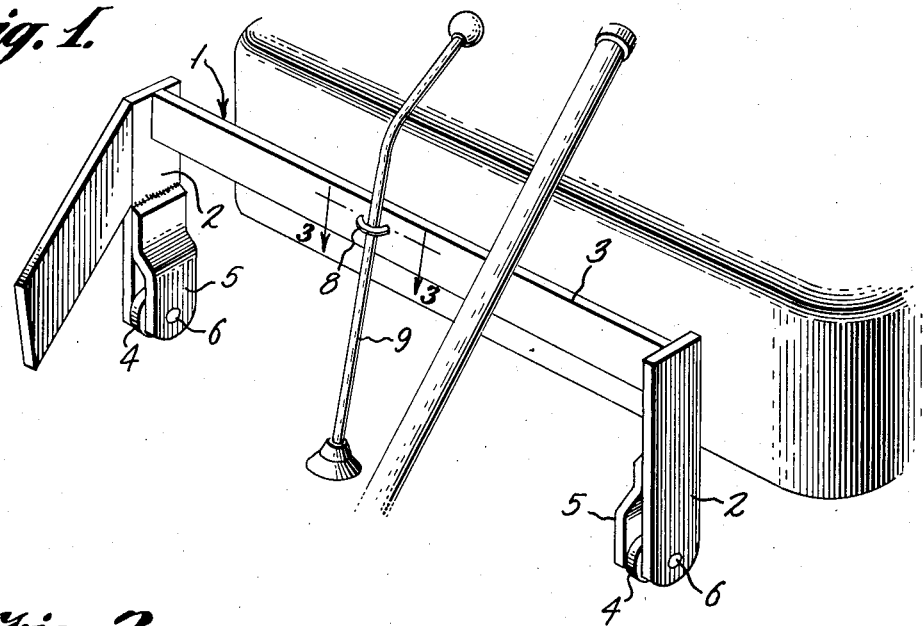
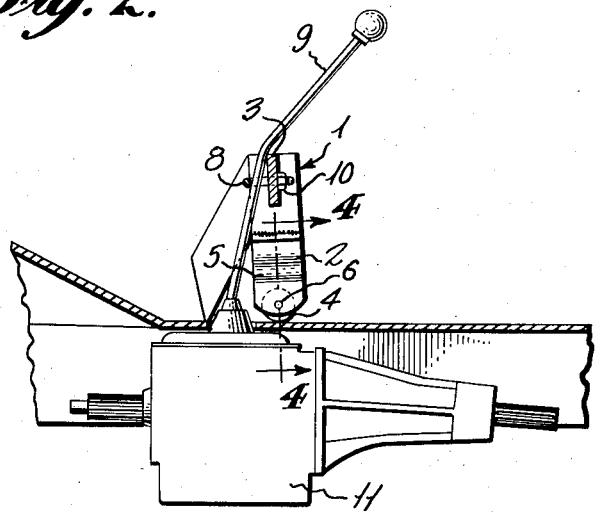
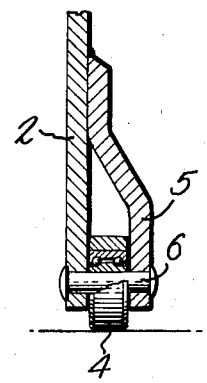
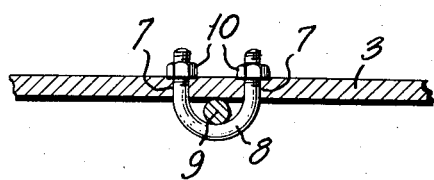
INVENTOR
Rhea Moore
BY *Mason, Fenwick & Lawrence*
ATTORNEYS

United States Patent Office 2,894,707
Patented July 14, 1959

2,894,707

TRANSMISSION SUPPORTING DEVICE

Rhea Moore, Walters, Okla.

Application September 24, 1954, Serial No. 458,099

2 Claims. (Cl. 248—323)

This invention relates to devices for supporting and moving automotive transmissions when they are disconnected from their normal supports for repair purposes.

In automotive equipment, and trucks in particular, the transmission is very heavy and difficult to handle. Usually, the transmission is bolted to, and supported by, the clutch housing. When it is necessary to make clutch repairs, the transmission must be unbolted and moved away in order to gain access to the clutch. When the repairs are made, the transmission must be moved up, held in proper alignment and bolted in place.

The object of the present invention is to provide a device which may be attached to the transmission before it is unbolted from the clutch and support it and facilitate its movement away from and toward the clutch.

Another object is the provision of such a device which is extremely simple in construction and operation, and which may be manufactured at low cost.

Other objects of the invention will become apparent from the following description of one practical embodiment thereof when taken in conjunction with its drawings which accompany, and form part of, this specification.

In the drawings:

Figure 1 is a perspective view of a supporting device embodying the principles of the present invention, shown in position in a truck coupled to the transmission shift lever;

Figure 2 is a fragmentary longitudinal section through a truck chassis showing the supporting device connected to and supporting the transmission;

Figure 3 is a partial horizontal section taken on the line 3—3 of Figure 1; and

Figure 4 is a fragmentary vertical section on an enlarged scale, taken on the line 4—4 of Figure 2.

Referring to the drawings in detail, there is shown a transmission support in the form of a movable carriage 1. This support is adapted to have a transmission connected to it to hold the transmission and move it toward and from the clutch assembly. The carriage is arranged to stand and move upon the cab floors or chassis frames of trucks or other automotive equipment.

The carriage comprises a pair of upright legs 2, spaced apart and held in spaced relation by means of a bridge bar 3. The legs are of flat steel having their flat sides parallel. The bridge bar is connected to the tops of the legs and is composed of a piece of flat steel with its flat surface in a vertical plane. The lower portions of the legs are forked to receive ball bearing rollers 4. The forks are formed by attaching steel strips 5 to the inner surfaces of the legs above the bottom and appropriately bending the strips to place their lower portions in spaced relation to the major members of the legs. The rollers are mounted on axles 6 which pass through the lower ends of the major leg members and the strips 5.

The bridge bar 3 is provided with spaced openings 7 at its center to receive the legs of a U-bolt 8. The U-bolt is inserted from the front of the bar and is adapted to surround the transmission shift lever 9 and bind it against the bridge bar. Nuts 10 hold the U-bolt in place. The shift lever is shown as projecting from the top of transmission 11 in the usual manner.

It will be seen from Figures 1 and 2 that the bridge bar is mounted centrally between the front and back edges of the legs. As the U-bolt extends to the front of the bridge bar and the transmission is held between the U-bolt and bridge bar, the transmission weight will be forward of the vertical center line of the leg and tend to rock the support forward. Due to this weight arrangement, a brace 12 is provided to prevent forward tipping of the device. The brace is shown as attached to the upper forward edge of one leg and extending diagonally forward to rest upon the cab floor or chassis frame. It will be obvious that braces may be attached to both legs if desired.

When it is desired to make a clutch repair, the transmission support carriage is placed in position with its rollers resting on the chassis frame or floor board. The U-bolt is removed, and the carriage rolled forward until the transmission shift lever contacts the bridge bar. The U-bolt is slipped around the shift lever and through the holes in the bridge bar and the nuts are threaded onto the U-bolt and drawn up tight. The transmission can now be unfastened from the clutch and will be held in position suspended from the support carriage. By tilting the carriage rearwardly the carriage and transmission can be rolled away from the clutch. The carriage will tilt forward and rest on the brace while the repair is being made. The transmission can then be rolled forward into place and bolted to the clutch housing. Due to the fact that the transmission is connected to the support carriage before it is disconnected from the clutch, the transmission will maintain its position and move into correct place for attachment to the clutch housing after the repair is made.

While in the above one practical embodiment of the invention has been disclosed, it will be understood that the precise details of structure shown and described are merely by way of example, and the invention may take other forms within the scope of the appended claims.

What is claimed is:

1. A carriage for travel along a vehicle chassis frame for supporting a transmission having a shifting lever during removal of the transmission from the chassis assembly, after removal and during replacement comprising, an inverted open U-frame including straight legs spaced apart to span said chassis frame and a bridge bar extending horizontally between the tops of the legs, rollers mounted at the bottom of said legs to ride on said chassis frame, said rollers having axes lying in a vertical plane which includes said bridge bar when said leg is in vertical position, means centrally of the bridge bar to clamp the shifting lever of the transmission against one side of the bridge bar to suspend the transmission from the bridge bar, and a brace extending diagonally downward from at least one of said legs from that side of the leg corresponding to the side of the bridge bar against which the shifting lever is clamped of such length as to support said device with the legs inclined in the direction of the side of the bridge bar against which the shifting lever is clamped.

2. In a carriage as claimed in claim 1, said means for clamping the shifting lever against the bridge bar being a U-bolt having its legs spaced horizontally along the bridge bar and passing through the bridge bar.

References Cited in the file of this patent

UNITED STATES PATENTS

| 156,506 | Smith | Nov. 3, 1874 |
| 474,653 | Deffler | May 10, 1892 |
| 1,438,334 | Sabin | Dec. 12, 1922 |
| 1,680,548 | Keiser | Aug. 14, 1928 |
| 2,602,615 | Maynard et al. | July 8, 1952 |
| 2,616,651 | Coffing | Nov. 4, 1952 |